United States Patent

[11] 3,587,618

| [72] | Inventor | Richard L. Kenyon |
| | | Los Angeles, Calif. |
| [21] | Appl. No. | 850,180 |
| [22] | Filed | Aug. 14, 1969 |
| [45] | Patented | June 28, 1971 |
| [73] | Assignee | Parker-Hannifin Corporation |
| | | Cleveland, Ohio |

[54] AIRCRAFT FUEL TANK INERTING SYSTEM
28 Claims, 7 Drawing Figs.

[52] U.S. Cl. ..................................... 137/87,
137/209, 220/88
[51] Int. Cl. ..................................... G05d 11/00
[50] Field of Search ........................... 137/209-
—211, 87; 55/53, 160; 220/88 (B)

[56] References Cited
UNITED STATES PATENTS
2,341,268  2/1944  Davis .......................... 220/88B

| 2,586,839 | 2/1952 | Mapes .......................... | 220/88 |
| 2,983,405 | 5/1961 | Tayler .......................... | 220/88 |
| 3,229,446 | 1/1966 | Sebastian et al. .............. | 55/53 |

FOREIGN PATENTS

| 811,750 | 4/1959 | Great Britain ............... | 220/88B |
| 833,898 | 5/1960 | Great Britain ............... | 220/88B |

Primary Examiner—William F. O'Dea
Assistant Examiner—David J. Zobkiw
Attorney—John N. Wolfram ABSTRACT: A fire and explosion prevention system for aircraft fuel tanks that utilizes an inert gas for pressurizing the fuel tanks and in which means is provided for preventing overpressurization of the fuel tanks in case of either clogging of vent passages that normally connect the fuel tanks to atmosphere or failure of vent valves to open.

PATENTED JUN28 1971 3,587,618

INVENTOR.
RICHARD L. KENYON
BY
John N. Wolfram
ATTORNEY

INVENTOR.
RICHARD L. KENYON
BY
John N. Wolfram
ATTORNEY

3,587,618

AIRCRAFT FUEL TANK INERTING SYSTEM

BACKGROUND OF THE INVENTION

U.S. Pat. application Ser. No. 711,020 filed Mar. 6, 1968, and owned by the common assignee discloses a system for maintaining an inert atmosphere in aircraft fuel tanks for explosion and fire prevention. Such system has one portion that scrubs or removes oxygen dissolved in the liquid fuel and another portion that pressurizes the tank with inert gas when the tank pressure becomes low relative to ambient atmosphere. The system includes a passage for venting the fuel tanks to atmosphere to prevent pressure in the tanks from becoming too high relative to atmospheric pressure. Differences in the pressures between the vent passage and ambient atmosphere controls opening and closing of the vent passage to atmosphere and also controls introduction of inert fluid to the fuel tanks in case the pressure in the tanks becomes too low with relation to atmosphere. However, in some installations it is possible that during certain maneuvers of the aircraft liquid fuel can enter the vent system connections to the tanks and prevent proper venting of the tanks. If this occurs while inert fluid is being introduced into the tanks for increasing the pressure therein, it is possible for overpressurization of the fuel tanks to occur.

SUMMARY OF THE INVENTION

This invention provides an inerting system that avoids the possibility of overpressurizing the fuel tanks. Several methods are employed. In one method the inert fluid for pressurizing the fuel tank is introduced directly into the tank and its pressure is controlled by a pressure regulator so that it will exceed ambient atmospheric pressure by only a predetermined low value even though the fuel tank vent system is not functioning for any reason. In a second method the pressurizing inert gas is indirectly introduced to the fuel tank via the vent passage and under the control of an on-off valve in a manner such that if the vent openings to the tank become clogged with liquid fuel any excess pressure of inert gas will be vented direct to atmosphere and thus avoid overpressurizing the fuel tank. Still another method is a combination of the first two in which a pressure regulator valve is used in accordance with the first mentioned method and the inert gas is introduced via the vent system in accordance with the second method. In each case, the pressurizing system may be used either by itself or in conjunction with the scrubbing system referred to above.

DESCRIPTION

Figure 1:
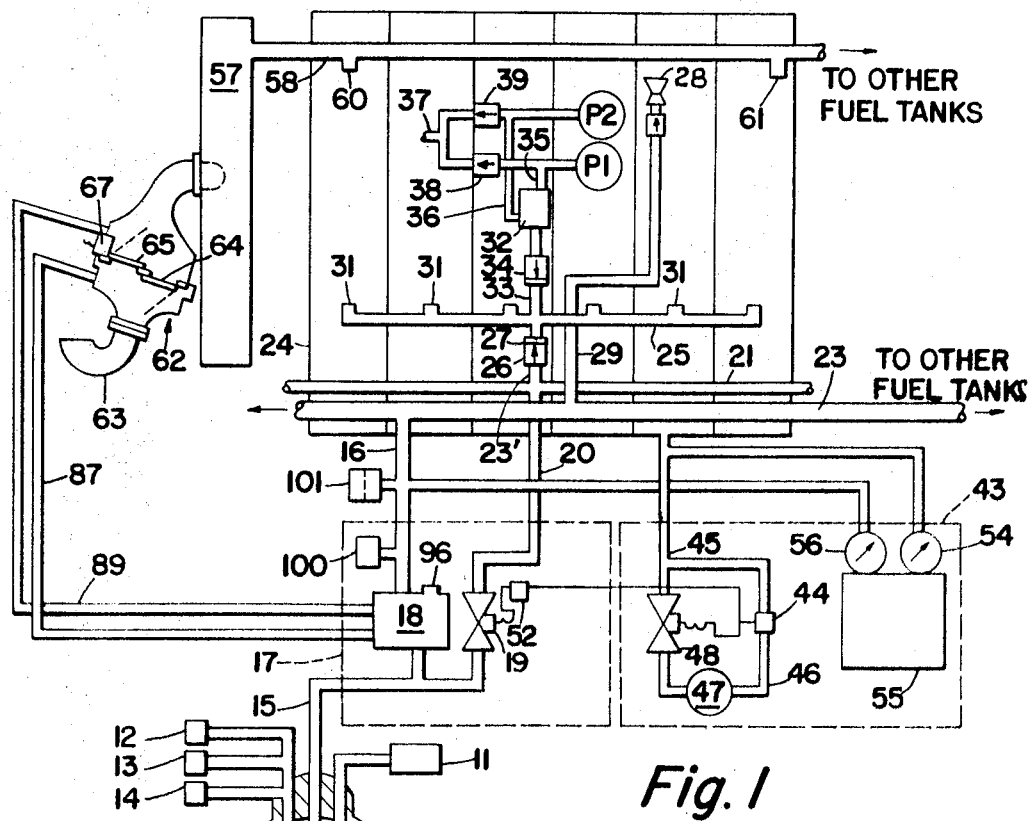
FIG. 1 is a schematic view of one form of the invention that introduces pressurizing fluid to the fuel tanks independently of the vent passage.

In the arrangement of FIG. 1, a dewar 10 contains a supply of liquid nitrogen conditioned to boil, for example, at 100 p.s.i. Connected to the dewar is a self-closing filler valve 11, a capped vent fitting 12, a relief valve 13, and a burst disc 14. An outlet conduit 15 leads from the dewar to a control unit 17 that has a large capacity pressure control valve 18 and a small capacity solenoid operated scrub valve 19, these valves being connected in parallel with conduit 15. The outlet side of valve 18 is connected to pressurization manifold 23 via conduit 16 and the outlet side of valve 19 is connected to a scrub manifold 21 via conduit 20. Manifolds 23 and 21 lead to a plurality of fuel tanks, one of which is shown at 24.

Within tank 24 is a constantly open large capacity fog nozzle 28 connected to manifold 23 by conduit 29. Scrub manifold 21 is part of a system for injecting nitrogen into the fuel tanks during flight for the purpose of scrubbing the liquid fuel during flight of the aircraft, that is, to remove oxygen dissolved in the liquid fuel. Such scrubbing system is disclosed in more detail in the above mentioned patent application but will be briefly described herein.

Scrub manifold 21 is connected by means of a check valve 26 and a restricted orifice 27 to a hollow spray bar 25 located near the bottom of the fuel tank and having spaced open nozzles 31.

Figure 2:
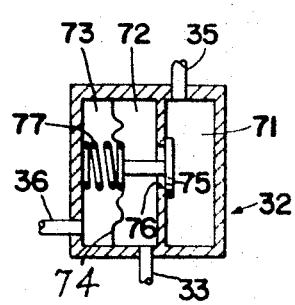
FIG. 2 is a cross section schematic view of a valve used in the systems.

Spray bar 25 is connected to a valve 32 by means of a conduit 33 and check valve 34. Valve 32 is connected to pumps $P_1$ and $P_2$ via lines 35, 36 which are also connected to fuel feed line 37 by means of check valves 38, 39. As shown in FIG. 2, valve 32 has an inlet chamber 71, a port 76, an outlet chamber 72, a pressure chamber 73 formed by diaphragm 74, and a spring 77 urging a poppet 75 toward open position.

A scrub sequencer unit 43 includes a pressure differential operated electrical switch 44 that is connected on one side by conduit 45 to fuel tank 24 and connected at its other side by conduit 46 to reference tank 47 which in turn is connected to conduit 45 by way of solenoid operated on-off valve 48. Pressure switch 44 is also electrically connected to a timer 52 which in turn is electrically connected to scrub solenoid valve 19. Conduit 45 has connected to it a pressure gauge 54 and a switch box 55. A pressure gauge 56 is connected to conduit 16.

Figure 6:
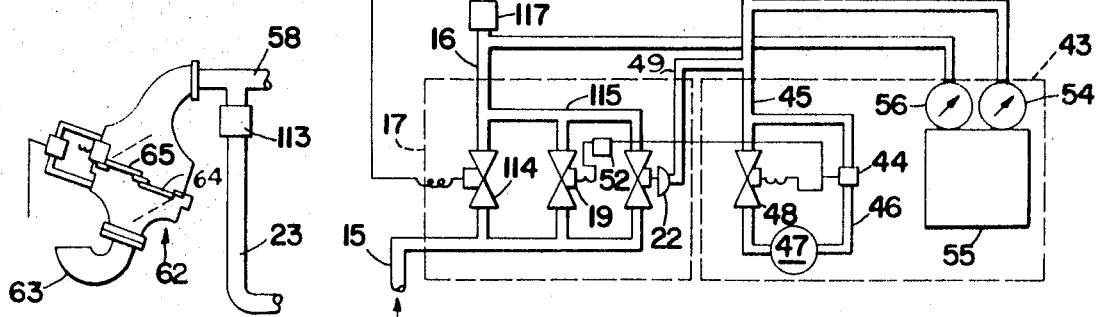
FIG. 6 is a view showing an alternate arrangement of the fuel tank vent passage.

The upper ends of tank 24 and other fuel tanks not shown have a vent passage that includes a large capacity vent pipe 58 extending through the upper portions of the fuel tanks and connected by vent ports 60, 61 and also includes a surge tank 57 to which pipe 58 is connected and a valve assembly 62 that has one of its ends connected to the surge tank and at its other end has an open scoop 63. In some installations surge tank 57 may be omitted and valve 62 connected directly to pipe 58 as shown in FIG. 6.

Because of the large capacity of pipe 58, all portions of the vent passage and all fuel tanks normally have substantially equal pressure. Each fuel tank has therein a fog nozzle 28 and a set of scrubbing nozzles 31, as described in connection with tank 24. Scoop 63 may be open to atmosphere in a direction facing the front of the aircraft so as to develop a ram air pressure therein that is slightly higher than atmospheric pressure but preferably not more than 2.8 p.s.i. greater. Even though such scoop pressure may be greater than actual ambient atmospheric pressure it is related thereto and may be referred to as atmospheric pressure. Alternatively, scoop 63 may be turned in other directions or replaced by a simple opening in assembly 62 so that in either case true atmospheric pressure is sensed on the atmosphere side of valves 64, 65.

Valve assembly 62 includes a spring-closed climb valve 64 that opens when vent passage pressure exceeds scoop pressure by 0.75 p.s.i., and also includes a spring-closed dive valve 65 that opens when the scoop pressure exceeds vent passage pressure 0.1 p.s.i. The open positions of these valves are shown by dotted lines. Dive valve 65 is also operable to an open position by a solenoid 67.

Figure 3:
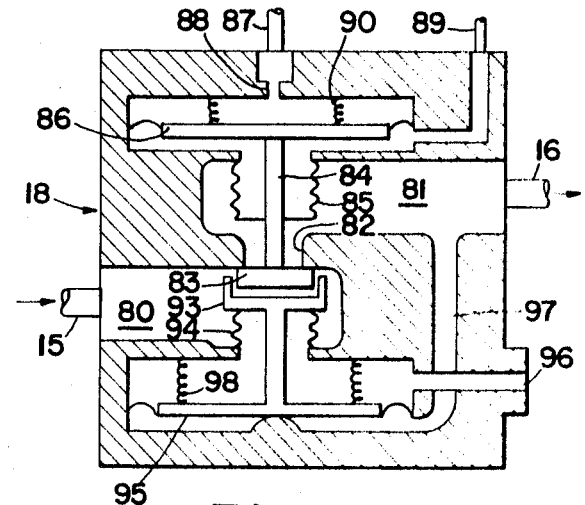
FIG. 3 is a cross section schematic view of a pressure regulator valve used to control the flow of pressurizing fluid in the FIG. 1 and FIG. 7 forms of the invention.

As shown in FIG. 3, pressure control valve 18 has inlet and outlet chambers 80, 81 connected by valve port 82 and respectively connected to conduits 15, 16. A primary valve element 83 has a stem 84 connected to a sealed bellows 85 and a diaphragm 86. The upper side of diaphragm 86 is exposed to pressure on the scoop side of valves 64, 65 via conduit 87 and restricted orifice 88 and the lower side is exposed to the vent passage side of valves 64, 65 via conduit 89. Spring 90 acts on diaphragm 86 to urge valve element 83 toward open position.

Valve 18 has a secondary valve element 93 connected to sealed bellows 94 and to diaphragm 95. The upper side of diaphragm 95 is exposed to atmosphere through port 96 and the lower side is exposed to outlet chamber 81 through passage 97. Spring 98 acts on diaphragm to urge valve 93 toward open position.

To guard against overpressurization of the fuel tanks with nitrogen entering through fog nozzles 28 in case valve 18 fails to properly limit its discharge pressure into conduit 16, a relief valve 100 and a burst disc 101 are connected to conduit 16.

In describing operation of the system the various pressures indicated are illustrative only, and other pressure values can be used as desired.

While the aircraft is on the ground and the fuel tanks have been filled, the pressure in tank 24 created by the tank-filling operation will not exceed ambient atmospheric pressure, as sensed at scoop 63, by more than 0.75 p.s.i. because of the venting action of climb valve 64. Also, the pressure in reference tank 47 is the same as the pressure in tank 24 because valve 48 is spring-operated to open position while aircraft electrical power is off. During such times that electrical power is not on and the pressure in the fuel tank becomes less than 0.25 p.s.i. above atmospheric (as for example, if the tank leaks before flight or if it is ruptured after a crash landing) valve 18 will open to admit nitrogen into the tank and provide inerting protection.

When electrical power is turned on, valve 48 closes to trap the ground pressure of fuel tank 24 in reference tank 47. Upon starting the engines and pumps $P_1$, $P_2$, fuel discharges from pump $P_2$ pressurizing chamber 73 via conduit 36 and maintains valve 75 in open position. At the same time, fuel discharge from pump $P_1$ passes through conduit 35, chambers 71 and 72, conduit 33, check valve 35 and into spray bar 25 from which it is injected through nozzle 31 into the fuel in tank 24 below the top level thereof. This fuel flow is continuous while the aircraft is in flight.

As the aircraft climbs the ambient atmospheric pressure decreases. When it has dropped so that fuel tank pressure exceeds the pressure in scoop 63 by more than 0.75 p.s.i., climb valve 64 will open to vent the fuel tanks until their pressure is within 0.75 p.s.i. of the scoop pressure and climb valve 64 then closes. This opening and closing action of valve 64 continues until cruising altitude is reached and thereafter the valve remains closed.

When the pressure in tank 24 decreases 0.5 p.s.i. either because of valve 64 opening during climb or because of fuel consumption, pressure switch 44 deenergizes valve 48 to open the same also starts timer 52. Opening of valve 48 connects reference tank 47 to tank 24 to equalize the pressures therein and therefore establish a new reference pressure in tank 47 that is 0.5 p.s.i. lower than the previous one. Switch 44 then permits valve 48 to close. Meanwhile, timer 52 has opened small capacity valve 19 and maintains it open for a preset time small flow of nitrogen into spray bar 25 where it mixes with fuel from valve 32 and both are discharged through nozzles 31 to form widely and substantially uniformly dispersed small bubbles of gaseous nitrogen in the liquid fuel. As the bubbles slowly rise through the liquid fuel they absorb by diffusion oxygen contained in the liquid fuel and carry it to the ullage where the nitrogen keeps the oxygen diluted below an explosive level. Timer 52 is operated by a momentary electrical pulse from switch 44 and immediately resets upon receiving another pulse before the timing period has expired.

As fuel is consumed at cruising altitude, and also when the aircraft is descending, the fuel tank pressure tends to become less than ambient atmospheric pressure and if this would be permitted to happen beyond a predetermined extent the tanks would collapse. To prevent this, when fuel tank pressure is above the pressure in scoop 63 by a predetermined minimum, such as 0.25 p.s.i., valve 18 is caused to open to deliver nitrogen into the tanks so as to maintain a pressure therein that exceeds the scoop pressure by the predetermined minimum. At the same time, it is necessary that fuel tank pressure be controlled so that it never exceeds ambient atmospheric pressure by more than a predetermined maximum, such as 3.5 p.s.i., otherwise the tanks will burst. Valve 18 performs both of these functions and does so regardless of whether vent openings 60, 61 for any or all fuel tanks are closed by liquid fuel, as may sometimes occur when the aircraft is subject to severe pitching, rolling or yawing.

Thus, when the fuel tank pressure as sensed through conduit 89 and the vent passage side of valve assembly 62 exceeds scoop pressure by less than the predetermined minimum value of 0.25 p.s.i., diaphragm 86 of valve 18 moves downward to open valve 83. Meanwhile, because previous to such opening of valve 83 the pressure in outlet chamber 81 of valve 18, and hence the pressure in manifold 23 and the fuel tanks, normally does not exceed ambient atmospheric pressure, as sensed at port 96 of valve 18, by more than the predetermined minimum value of 3.5 p.s.i., valve 93 also in an open position. Nitrogen from dewar 10 now flows through valve 18 and into the fuel tanks via conduit 16, manifold 23 and constantly open nozzles 28 to raise the pressure within the tanks to the point where it exceeds scoop pressure by 0.25 p.s.i. If at this time vent ports 60, 61 are open so that the vent passage pressure is the same as fuel tank pressure, diaphragm 86 will be actuated to close valve 83 and prevent further increase of fuel tank pressure. However, if vent ports 60, 61 are not open at this time, the increasing fuel tank pressure will not be reflected in vent passage 57 and diaphragm 86 will not be actuated to close valve 83. Pressure in the fuel tanks will then continue to rise as nitrogen continues to flow through valve 18 until such time that fuel tank pressure, as reflected in outlet chamber 81 of valve 18 and transmitted to the lower side of diaphragm 95, exceeds atmospheric pressure at port 96 by 3.5 p.s.i. At such time diaphragm 95 will move valve 93 to closed position for cutting of further flow of nitrogen to the fuel tanks and thus prevent overpressurization of the latter.

If valve 18 malfunctions while vents 60, 61 are open so as not to shut off when fuel tank pressure exceeds scoop pressure by more than 0.25 p.s.i., fuel tank pressure will rise to 0.75 p.s.i. over scoop pressure and climb valve 64 will hen open to prevent further increase in the pressure differential.

If valve 18 malfunctions so as to remain open when it should be closed, and if either vents 60 or 61 are clogged to prevent venting of the fuel tanks through valve 64, or if the latter sticks closed, dangerous overpressurization of the fuel tanks will be prevented by opening of relief valve 13 at a predetermined pressure in conduit 16 slightly more than 3.5 p.s.i. greater than ambient atmospheric and if relief valve 100 should fail to function, then by rupture of burst disc 101 at a still slightly higher differential between the pressures in conduit 16 and atmospheric.

Figure 4:
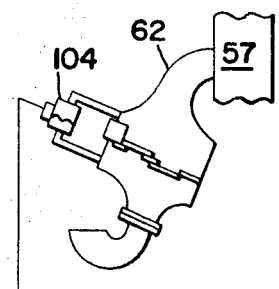
FIG. 4 is a schematic view of an alternate arrangement for controlling flow of pressurizing fluid in the FIG. 1 form of the invention by means of an on-off valve instead of a pressure regulator.
Figure 4:
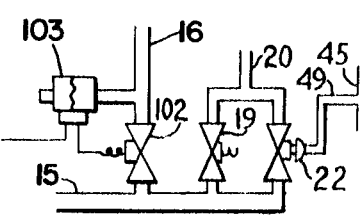

FIG. 4 illustrates an optional arrangement for preventing overpressurization of the fuel tanks in which an electrically operated on-off valve 102 under the automatic control of pressure switches 103 and 104 is substituted for pressure control valve 18 in FIG. 1. In this arrangement, valve 102 is normally spring-closed to off position when not electrically energized. If fuel tank pressure when vent ports 60, 61 are open and as sensed on the vent passage side of valve assembly 62 exceeds scoop pressure by less than 0.25 p.s.i., pressure switch 104 will energize valve 102 to open position to permit nitrogen to flow from dewar 10 into the fuel tanks to raise the pressure therein to more than 0.25 p.s.i. above scoop pressure, at which time switch 104 will deenergize valve 102 to close the same. If vent ports 60, 61 are blocked while pressure switch 104 is closed for energizing valve 102, pressure switch 103, which is normally closed and in series with switch 104, will open when pressure in the fuel tanks (as sensed in conduit 16) exceeds ambient atmosphere pressure by more than 3.5 p.s.i. This will close valve 102 and prevent further increase in fuel tank pressure.

Figure 5:
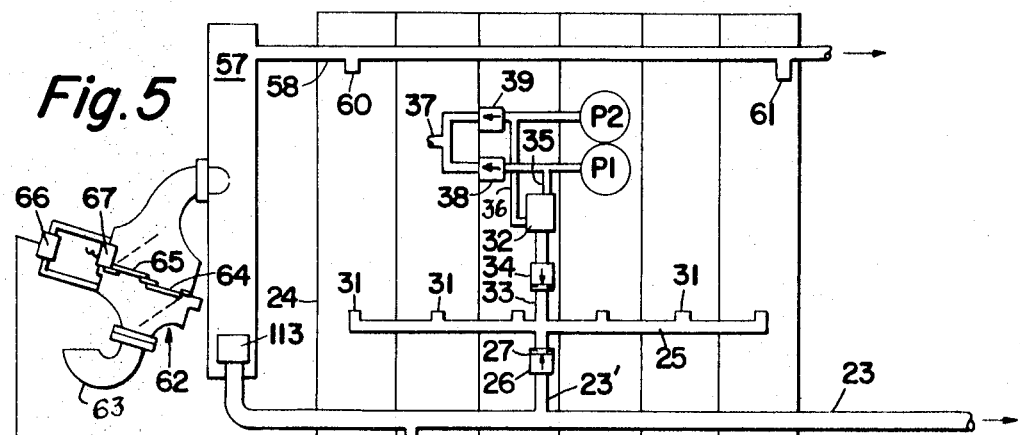
FIG. 5 is a schematic view of a second form of the invention that introduces pressurizing fluid to the fuel tanks by way of the vent passage.

The FIG. 5 form of the invention differs from the FIG. 1 form principally in that spray bar 25 is connected directly to pressurization manifold 23 to receive its supply of nitrogen therefrom, rather than being connected to separate scrub manifold 21, and in that nitrogen for pressurization is discharged from manifold 23 into the fuel tanks via the vent passage rather than directly into the fuel tanks. Thus, as shown in FIG. 5, spray bar 25 is connected to pressurization manifold 23 by way of orifice 27, check valve 26 and conduit 23' and manifold 23 is connected to surge tank 57 by way of a relief valve 113. Nitrogen supply line 15 has an electrically operated on-off valve 114 therein and the outlet ends of valves 19 and 22 are connected by conduit 115 to conduit 16 leading to manifold 23. Conduit 16 includes a heat exchanger 117 for vaporizing the liquid nitrogen before it enters manifold 23. Valve 114 is electrically connected to a pressure switch 66 having its opposite sides respectively connected to the vent passage side and scoop side of valve assembly 62.

Operation of valves 19 and 48 for scrubbing oxygen from the fuel during climb of the aircraft occurs in the same manner as in connection with FIG. 1 except for passage of the nitrogen through pressurization manifold 23 to tank scrub manifold 25.

When vent system pressure becomes less than 0.25 p.s.i. over scoop pressure, as either during the fuel consumption at cruise or during descent, pressure switch 66 will energize valve 114 to open the latter. Large flow of nitrogen will then take place into manifold 23 and rapidly build up the pressure therein so as to open relief valve 113, even though some of the nitrogen will pass through the constantly open small capacity scrub nozzles 31. Opening pressure of relief valve 113 may, for example, be 40 p.s.i. As the nitrogen passes through valve 114, substantially all of it is in liquid form but it becomes vaporized as it passes through heat exchanger 117. The large flow of vaporized nitrogen through relief valve 113 passes through surge tank 57, vent pipe 58 and vent openings and enters the 60, 61 into the fuel tanks to raise the pressure therein. When the pressure in the vent passage, and hence in the fuel tanks, is raised so as to exceed scoop pressure by more than 0.25 p.s.i., pressure switch 66 will be actuated to deenergize valve 114 to close the same and discontinue large flow of nitrogen therethrough. Relief valve 113 will then close.

The above-described action for opening valve 114 when vent passage pressure becomes less than 0.25 p.s.i. above scoop pressure and closing valve 114 when the pressure differential exceeds this amount occurs regardless of whether vents 60, 61 are clogged. Furthermore, if valve 114 should malfunction and remain open when it should be closed, the pressure in the vent passage and in the fuel tanks will rise to only the differential setting of climb valve 64, namely 0.75 p.s.i. over scoop pressure, whereupon valve 64 will open to vent the uncontrolled flow of nitrogen to atmosphere and prevent it from creating an excessive pressure in the fuel tanks. This same action will occur if the vent ports 60, 61 become clogged while valve 114 is in open malfunctioning condition and therefore clogging of the vent ports presents no hazard.

In the forms of FIGS. 4 and 5 a normally spring-closed pressure regulator 22 is added to provide inerting protection when electric power is off, as before flight or after a crash landing. Valve 22 is connected to conduits 15 and 20 in parallel with valve 19 and is also connected by pressure sensing conduit 49 to conduit 45 and hence to the fuel tanks. When electric power is off so that valve 102 is nonoperative and tank pressure drops within 0.125 p.s.i. of ambient, an actuator element in valve 22 that is exposed to both atmosphere and pressure in conduit 49 opens valve 22 to admit nitrogen to the tanks via conduit 20 and nozzles 31. Valve 22 closes again when tank pressure exceeds atmospheric by more than 0.125 p.s.i.

FIG. 6 illustrates a variation of the FIG. 5 arrangement in that surge tank 57 is omitted, valve assembly 62 is connected directly to vent pipe 58, and nitrogen manifold 23 is connected to vent pipe 58 via relief valve 113. Similarly, the surge tank could be omitted from the FIG. 1 and FIG. 7 forms.

Figure 7:
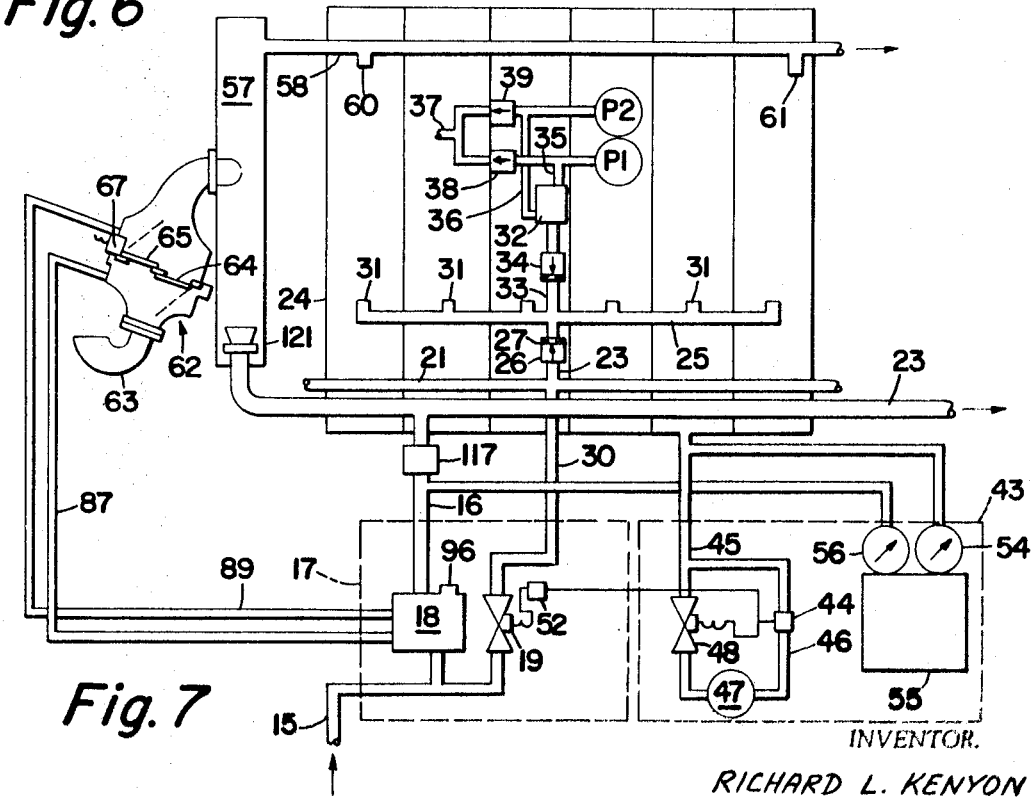
FIG. 7 is a schematic view of a third form of the invention that combines features of the FIG. 1 and FIG. 5 forms.

In the FIG. 7 modification valve 18 is the same as in FIG. 1 and operates in the same manner. A scrub manifold 21, separate of pressurization manifold 23 is provided, also as in FIG. 1. Manifold 23 is connected to surge tank 57 as in the FIG. 5 form but through a constantly open nozzle 121. There is also a heat exchanger 117 in conduit 16 downstream of valve 18, although it could be located in conduit 15 upstream of valve 18 either before or after the connections to valves 19, 22. Operation of valves 19 and 48 for scrubbing the fuel during climb and actuation of valve 18 for increasing the pressure in the fuel tanks occurs as in FIG. 1. However, upon opening of valve 18 the large flow of nitrogen therethrough, after being vaporized by heater 117, passes from manifold 23 into surge tank 57 through open nozzle 121 and then through pipe 57 to the fuel tanks. If vents 60, 61 become clogged while valve 18 is open, overpressurization of the fuel tanks cannot occur because valve 18 receives its signal to close from the difference between vent passage pressure and scoop pressure and this differential will be prevented from becoming greater than 0.75 p.s.i. by valve 64. If manifold 23 should break within a tank having clogged vents while valve 18 is stuck open when it should be closed, pressure in such tank will not become excessive because manifold 23 will continue to be vented to atmosphere through valve 64.

I claim:

1. An inerting system comprising a fuel tank containing liquid fuel, a vent passage connecting the fuel tank to atmosphere, a normally closed valve between the vent passage and atmosphere, a storage tank containing inert fluid, first means responsive to a differential between vent passage pressure and atmospheric pressure lens than a predetermined minimum value to introduce inert fluid from the storage tank into the fuel tank to increase the pressure therein, and second means other than said valve to prevent the pressure differential between the fuel tank and atmosphere from exceeding a predetermined maximum value irrespective of whether the vent passage connection to the fuel tank is open or closed.

2. The system of claim 1 in which the vent passage includes a surge tank for trapping liquid fuel entering the vent passage from the tank.

3. The system of claim 1 in which the first means introduces the inert fluid into the fuel tank by way of the vent passage.

4. The system of claim 1 in which said normally closed valve is responsive to a predetermined excess of vent passage pressure over atmospheric pressure to open the vent passage to atmosphere.

5. An inerting system comprising a fuel tank containing liquid fuel, a vent passage connecting the fuel tank to atmosphere, a storage tank containing inert fluid, a supply passage connecting the storage tank to the fuel tank, a valve in said supply passage, first means responsive to a differential between vent passage pressure and atmospheric pressure below a predetermined minimum to open said valve to permit flow of fluid from the storage tank through the supply passage into the fuel tank to increase the pressure therein, and second means responsive to a predetermined maximum differential between supply passage pressure and atmospheric pressure to close said valve.

6. The system of claim 5 in which there is another valve between the vent passage and atmosphere and responsive to a predetermined excess of vent passage pressure over atmospheric pressure to open the vent passage to atmosphere.

7. The system of claim 5 in which there is a second valve between the vent passage and atmosphere and responsive to a predetermined excess of atmospheric pressure over vent passage pressure to open the vent passage to atmosphere.

8. The system of claim 5 in which there is a second supply passage connecting the storage tank to the fuel tank, a second valve in said second supply passage, means establishing a reference pressure, and means responsive to a predetermined differential between fuel tank pressure and reference pressure to open said second valve to permit inert fluid to flow from the storage tank to the fuel tank.

9. The system of claim 8 in which the second supply passage is connected to the first mentioned supply passage upstream of said first mentioned valve.

10. The system of claim 5 in which the vent passage is independent of the supply passage.

11. The system of claim 10 in which said valve is a modulating pressure regulator.

12. The system of claim 10 in which said valve is a pressure regulator having separate valve elements in series, one element being responsive to said maximum differential pressure for closing the supply passage and the other element being responsive to a predetermined maximum differential between vent passage pressure and atmospheric pressure for closing said supply passage.

13. The system of claim 10 in which the supply passage includes a constantly open nozzle within said fuel tank.

14. The system of claim 13 in which there is a second supply passage connecting the storage tank to the fuel tank, and there is a separate means independent of said valve for controlling flow of fluid from the storage tank to the fuel tank.

15. The system of claim 5 in which said valve is an electrically operated on-off valve and said first and second means include a pair of differential pressure operated devices acting in series to control said valve.

16. The system of claim 5 in which the vent passage forms part of the supply passage.

17. The system of claim 16 in which said valve is an on-off valve.

18. The system of claim 16 in which there is a relief valve between the supply passage and the vent passage responsive to a predetermined excess of supply passage pressure over vent passage pressure to move to open position for admitting inert fluid to the fuel tank.

19. The system of claim 5 in which the inert fluid is stored in liquid form in the storage tank and there is a means in the supply passage for vaporizing the inert fluid.

20. The system of claim 5 in which said supply passage has a branch bypassing said valve, and there is a means controlling flow of fluid from the storage tank to the fuel tank via said branch.

21. The system of claim 20 in which said supply passage has another branch bypassing the vent passage and connected to the fuel tank and there is a valve means for controlling opening and closing of said another branch.

22. The system of claim 5 in which the vent passage forms a part of the supply passage and said valve is a modulating pressure regulator comprising two normally open valve elements in series, one element being responsive to said maximum differential pressure for closing the supply passage and the other element being responsive to a predetermined maximum differential between vent passage pressure and atmospheric pressure for closing said supply passage.

23. The system of claim 5 in which the vent passage is joined to the supply passage to form a part of the latter, and there is a constantly open nozzle in the supply passage to deliver inert fluid from the supply passage to the vent passage at said junction.

24. The system of claim 5 in which the vent passage forms a part of the supply passage, the inert fluid is in liquid form in the storage tank and there is a means for vaporizing said inert liquid between the vent passage and the storage tank, and said valve is a normally open pressure regulator.

25. The system of claim 5 in which said valve is a normally open pressure regulator in said supply passage, and there is a separate means connected to the storage tank bypassing said valve and responsive to predetermined pressure conditions in the fuel tank to deliver inert fluid to the fuel tank.

26. The system of claim 5 in which said valve is electrically operated and there is another supply passage connecting the storage tank to the fuel tank, and a pressure regulator valve in said another supply passage responsive to differential in tank pressure and atmospheric pressure below a predetermined minimum to admit inert fluid to the fuel tank.

27. An aircraft inerting system comprising a fuel tank, a vent passage connected to the fuel tank for venting the tank to atmosphere, a normally closed valve between the vent passage and atmosphere, first means responsive to a differential between vent passage pressure and ambient atmospheric pressure less than a predetermined minimum to introduce an inert fluid into the fuel tank to increase the pressure therein, said first means including an inert fluid supply conduit connected to the fuel tank, and second means to prevent the pressure differential between atmosphere and the inert fluid in the supply conduit where it is connected to the tank from exceeding a predetermined maximum irrespective of whether the vent connection to the fuel tank is open or closed.

28. An aircraft inerting system comprising a fuel tank, a vent passage connected to the fuel tank for venting the tank to atmosphere, a normally closed valve between the vent passage and atmosphere, means responsive to a differential between vent passage pressure and ambient atmospheric pressure less than a predetermined minimum value to introduce an inert fluid into the vent passage to increase the pressure in the tank, said vent passage pressure being sensed at a location remote from the connection of the vent passage to the fuel tank.

UNITED STATES PATENT OFFICE
CERTIFICATE OF CORRECTION

Patent No.  3,587,618    Dated  June 28, 1971

Inventor(s)  Richard L. Kenyon

It is certified that error appears in the above-identified patent and that said Letters Patent are hereby corrected as shown below:

In the specification, column 2, line 38, after _connected_ insert --therewith--.

Column 3, line 5, after _diaphragm_ insert --95; line 54, after _time_ insert --to permit--.

Column 4, line 15, change "minimum" to --maximum--; line 38, change "hen" to --then--.

Column 5, line 32, after _the_ insert --vents--.

Column 8, line 21, after _to_ insert --a--.

Signed and sealed this 13th day of June 1972.

(SEAL)
Attest:

EDWARD M. FLETCHER, JR.
Attesting Officer

ROBERT GOTTSCHALK
Commissioner of Patents